(12) United States Patent
Bouic

(10) Patent No.: US 6,797,361 B2
(45) Date of Patent: Sep. 28, 2004

(54) FOAM ARTICLES (75) Inventor: Phillip J. Bouic, Warwicks (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/121,492

(22) Filed: Apr. 12, 2002

(65) Prior Publication Data

US 2002/0160154 A1 Oct. 31, 2002

(30) Foreign Application Priority Data

Apr. 12, 2001 (GB) ............................................. 0109177

(51) Int. Cl.[7] .............................. B32B 3/00; B32B 3/26; B32B 7/12; B32B 23/02
(52) U.S. Cl. ..................... 428/156; 428/158; 428/317.1; 428/317.3; 428/319.3; 428/315.9; 428/316.6; 428/71; 428/88; 428/192; 428/304.4; 428/309.9
(58) Field of Search ................................. 428/156, 157, 428/159, 158, 317.1, 317.3, 315.9, 316.6, 88, 71, 76, 192, 309.9, 304.4

(56) References Cited

U.S. PATENT DOCUMENTS

| | | | |
|---|---|---|---|
| 4,996,092 A | 2/1991 | Francis et al. | |
| 5,407,716 A | 4/1995 | Mitchell | |
| 5,547,725 A | * 8/1996 | Barrows et al. | ............... 428/43 |
| 5,747,094 A | 5/1998 | Liddell | |
| 5,871,835 A | 2/1999 | Voss | |
| 5,998,018 A | 12/1999 | Murakami et al. | |
| 6,086,709 A | 7/2000 | Hills | |
| 6,270,886 B1 | 8/2001 | Ono et al. | |
| 2002/0025383 A1 | 2/2002 | Siero | |

FOREIGN PATENT DOCUMENTS

| | | |
|---|---|---|
| EP | 0 384 626 | 8/1990 |
| EP | 0 875 548 | 11/1998 |
| EP | 0 795 356 B1 | 5/1999 |
| EP | 0 967 019 | 12/1999 |
| EP | 1 025 910 | 8/2000 |
| GB | 2 254 812 | 10/1992 |
| GB | 2 327 052 | 6/1999 |
| GB | 2 344 301 | 6/2000 |
| WO | WO 94/10255 | 5/1994 |
| WO | WO 94/20584 | 9/1994 |
| WO | WO 95/21700 | 8/1995 |
| WO | WO 95/24273 | 9/1995 |
| WO | WO 99/46056 | 9/1999 |
| WO | WO 99/52646 | 10/1999 |

* cited by examiner

*Primary Examiner*—Harold Pyon
*Assistant Examiner*—Catherine A. Simone
(74) *Attorney, Agent, or Firm*—Pamela L. Stewart (57) ABSTRACT

A foam article for use as a masking material when spray painting a vehicle comprises a plurality of foam strips 1a, 1b, 1c joined together by a common seam 4 along at least one side edge to form a cord 6. The cord 6 can be adapted for masking across gaps of different size in different locations by superimposing the appropriate combination of foam strips 1a, 1b, 1c to provide the required thickness of cord 6. The cord 6 may be secured by wedging in the gap or by attaching an adhesive stripe 2 on at least one of the foam strips 1a to a surface on the inside or outside of the gap. The cord 6 may also be re-used by removing any painted foam strips or by re-arranging the foam strips to conceal any painted foam strips.

24 Claims, 6 Drawing Sheets

FOAM ARTICLES

This application claims priority to United Kingdom Patent Application Number 0190177.6, filed Apr. 12, 2001.

FIELD

This invention concerns improvements in or relating to foam articles. The invention has particular, but not exclusive, application to foam articles for use as masking materials when painting part of a vehicle to protect another part of the vehicle so that paint is only applied to the selected part of the vehicle. The invention also concerns a method of manufacturing such foam articles.

More specifically, the invention relates to foam articles for use as masking materials to block temporarily a gap between two parts of a vehicle to prevent paint entering the gap when the vehicle is being spray painted. The foam articles of this invention are especially suitable for use in vehicle body shops when re-spraying part of a vehicle following a repair.

BACKGROUND

It is already known to use masking materials in the form of an elongate foam strip to fill the gap between a movable part of the vehicle such as a door, hood or trunk and an adjacent part of the vehicle. Typically the foam strip has a longitudinally extending stripe of pressure sensitive adhesive by means of which the foam strip can be secured in the required position prior to painting and subsequently removed after painting.

The size and shape of the gap, and the available surface for mounting the foam strip may vary according to the position of the gap. For example, in a vehicle, the "A" post is the pillar situated between the vehicle body and the front edge of the front door, the "B" post is the pillar situated between the rear edge of the front door and the front edge of the rear door, and the "C" post is the pillar situated between the rear edge of the rear door and the vehicle body.

Typically, the "A" post supports the hinges for the front door, the "B" post supports the catch for the front door and the hinges for the rear door, and the "C" post supports the catch for the rear door. Often, a different type of foam strip is required to block the gap formed at each of these positions with each type of foam strip being provided in a range of sizes to accommodate variations in the dimensions of the gap between different makes or models of vehicle.

As a result vehicle body shops have to stock many types of foam strips in a variety of sizes to cover all possible applications. This is expensive both in terms of the amount of stock required and the space required to store the stock.

Furthermore, the user has to select and fit the correct type and size of foam strip for a given application, and use of the wrong foam strip may allow paint to penetrate the gap requiring corrective work to be carried out. This involves extra time and materials to complete a repair which reduces efficiency and profitability.

A foam strip is disclosed in International Patent Application No. WO99/52646 assigned to the assignee of the present application having a generally elongate cross-section with rounded ends which can be used as a masking material in more than one position when painting a vehicle. In particular, the foam strip of this application can be used to mask the gap formed at the "A" or "B" post of a vehicle as well as the gap formed between the rear edge of the vehicle body and a tailgate.

Such foam strip reduces the number of types of foam strip required for use at different positions of the vehicle and offers significant advantages and benefits to the user by allowing the same foam strip to be used in more than one location.

The problem still remains however that a given thickness of foam strip may not be capable of masking gaps of different size and different thicknesses of foam strips may still be required for effective masking of these gaps.

Moreover, the foam strips currently used as masking materials including the foam strip of WO99/52646 require access to the gap to be masked for securing the foam strip by means of the adhesive stripe and particular problems arise when masking the "A" post. Thus, there is only limited access to the gap in both the closed and open position of the door for inserting and sticking the foam strip to the appropriate surface. As a result, attaching the foam strip in the required position to mask across the gap when the door is closed is often a difficult and time consuming operation.

Furthermore, the existing foam strips including the foam strip of WO99/52646 are only suitable for use once and, after painting, are removed and thrown away. Thus, on first use, the exposed portion of the foam strip is painted and the foam strip cannot be re-attached to conceal the painted portion and present a new, clean portion of the strip. As a result, re-use of the foam strip is at best unsatisfactory and is generally avoided.

SUMMARY

The present invention provides a foam article which can be used as a masking material having an even wider range of application for masking gaps of different types and different sizes than existing masking materials.

Furthermore, the present invention provides a foam article for use as a masking material that is capable of being secured in position without the use of adhesive.

Moreover, the present invention provides such a foam article for use as a masking material that can be used where access to a surface for adhesively securing the article is limited or restricted.

Additionally, the present invention provides such a foam article for use as a masking material that can be used more than once.

More specifically, the present invention provides a foam article, the manufacture of such article and the use thereof as a masking material to mask a gap when painting a vehicle which has generally universal application for masking gaps at different locations and in a range of sizes.

In one aspect, the present invention provides a foam article for use as a masking material comprising a plurality of elongate foam strips, each strip having a longitudinally extending edge and being joined at said longitudinally extending edge to a longitudinally extending edge of at least one further elongate strip by a seam common to all said strips.

By forming the foam article from a plurality of foam strips, the foam article can be adapted to provide masking material of the required thickness for use in any selected one of a range of different types and size of gap by the selection of the appropriate number of foam strips to mask the gap.

Moreover, it may be possible to locate and retain the masking material without the use of adhesive by relying on the compression of the masking material through the selection of the appropriate number of foam strips to wedge the masking material in the gap.

Furthermore, after use, the masking material can be re-used by arranging the foam strips to mask a gap with fresh or clean surfaces of the masking material exposed.

Typically, each foam strip is of generally elongate cross-section having longitudinally extending edges on opposite sides of a longitudinally extending body portion.

In one embodiment, the common seam joins all the foam strips along one side edge and the other side edge is free. In this way, the foam strips are secured longitudinally to radiate from said common seam. As a result, the foam strips can be arranged to superimpose different combinations of the foam strips to provide different thicknesses of masking material.

Advantageously, the foam strips are separable along said common seam. In this way, any foam strips that are not required can be removed to leave the desired thickness of masking material.

Furthermore, after use, any foam strips that are painted can be removed and the remaining foam strips arranged to provide masking material for another use.

Removing any painted foam strips reduces the thickness of masking material that can be produced with the remaining foam strips. It may be possible to re-use the masking material without reducing the thickness by re-arranging the foam strips so that any painted foam strips are concealed by unpainted foam strips when the masking material is secured in position.

In another embodiment, the common seam joins all the foam strips along one side edge and a further common seam joins all the foam strips along the other side edge. In this way, the foam strips are secured relative to each other in a superimposed relationship to provide masking material having a thickness corresponding substantially to the combined thickness of the individual foam strips.

Advantageously, the foam strips are separable along said common seams. In this way, the outermost foam strips can be removed to vary the thickness of the masking material.

Additionally, after use, any foam strips that are covered in paint can be removed and the remaining foam strips arranged to provide masking material for another use.

In either construction, the number and/or thickness of the foam strips may be chosen to provide the masking material with any desired range of thicknesses by selecting an appropriate combination of foam strips.

For example, the foam strips may all be of the same thickness or at least one foam strip may be of different thickness to the other foam strip(s). Generally, the foam strips are selected when combined to provide masking material having a maximum thickness of up to about 30 mm.

Furthermore, the foam material of the foam strips may be chosen to provide the masking material with any desired properties. For example, the foam strips may all be of the same type of foam material or at least one foam strip may be of a different type of foam material.

Typically, the foam material employed may be an open or closed cell polymeric foam that is resiliently compressible for conforming to a required shape for a given application. Foams having a density in the range of from 20 to 30 Kg/m$^3$ are generally found to be useful for use as masking materials.

The foam strips may all be of the same colour. Alternatively, different properties or characteristics of the foam strips such as thickness or type of foam material, may be distinguished by different colours or combinations of colours. Colour coding the foam strips in this way has advantages for both the manufacture and use of masking materials with the appropriate combination of foam strips for the required application.

Different colours may also be used to provide a colour contrast de-limiting a sight line at the boundary between differently coloured portions of the foam strips to assist in accurately positioning the masking material.

Typically, the foam strips are made of cold weldable material. In this way, the foam article may be produced by forming a cold weld seam along at least one side edge of the foam strips. Preferred foam materials include polystyrene, polyvinylchloride, polyethylene, polyurethane, polyisocyanate, polyphenol, polyester and silicone foams.

The foam material may be cold welded by applying pressure to superimposed layers of foam web with a former such as a rotatable pressure roller or wheel so as to compress the layers of foam web sufficiently to cause the foam layers to fuse together.

A cold weld seam formed in this way unites the layers of foam material to each other along the seam and allows individual layers to be separated from the other layers which remain united along the seam.

The foam articles may be provided with a longitudinal adhesive stripe on at least one foam strip for sticking the foam article in position. Preferred adhesives are pressure sensitive adhesives such as a hot melt rubber adhesive. The adhesive may be applied to the foam by any suitable means, for example die coating, before or after the cold welding operation.

In another aspect, the present invention provides a method of manufacturing a foam article for use as a masking material including the steps of providing a plurality of sheets of foam material, superimposing the sheets of foam material, joining the sheets of foam material at a plurality of spaced positions by longitudinally extending parallel seams, and separating the sheets of foam material along the seams to produce a plurality of elongate foam articles, wherein each foam article comprises a plurality of foam strips joined together by at least one seam a side edge of the foam strips.

The foam article produced by the above method may have the foam strips joined together along both side edges so that the foam strips are secured in superimposed relationship to each other. This form of the foam article can be used as a masking material and can be adapted to a required thickness of masking material for a given application by removing one or more of the foam strips.

Alternatively, the foam strips may be joined together along one side edge only so that the foam strips radiate from the seam. This form of the foam article can also be used as a masking material and can be adapted to any desired thickness by superimposing the appropriate number of foam strips.

Typically, the foam material is cold weldable and the seams are formed by compressing the sheets of foam material to fuse the sheets together along the seams. The cold welding operation may be effected by a former such as a rotary pressure wheel or roller and a plurality of seams may be formed simultaneously by arranging a series of formers transversely spaced across the superimposed sheets of foam material.

In one method, the foam strips are joined together by cold weld seams along both side edges when the sheets of foam material are separated to produce one form of foam article, and the seam along one side edge can be optionally ruptured if it is desired to produce another form of foam article. In this way, both forms of the foam article each comprising a plurality of foam strips can be produced by the same method.

By forming the foam article with cold weld seams along one or both side edges of the foam strips, the foam strips can be arranged to provide any required thickness of masking material for a given application as described previously and, after use, the arrangement of the foam strips can be adapted so that the masking material can be re-used.

For example, where the foam strips are joined along both side edges, any painted foam strips may be removed to expose a new, unpainted foam strip below for re-use of the masking material.

Similarly, where the foam strips are joined along one side edge, any painted foam strips may be removed leaving the remaining new, unpainted foam strips for re-use of the masking material.

Alternatively, where the foam strips are joined along one side edge, the foam strips may be folded and superimposed in a different orientation so that the painted foam strips are concealed for re-use of the masking material.

The options and variations for altering and adapting the masking material for re-use are numerous and will be understood by those skilled in the art.

Thus, in another aspect, the present invention provides a foam article for use as a masking material comprising a plurality of foam strips, each foam strip having a body portion and side edges, and a cold weld seam releasably securing the foam strips together along at least one side edge whereby, in use of the foam article as a masking material, the arrangement of the foam strips can be adapted to enable the foam article to be re-used.

By releasably securing the foam strips, any foam strip that has been painted when the foam article is used as a masking material can be removed so as to leave new, unpainted foam strips for further use of the foam article as a masking material.

The foam articles of the present invention are particularly suited for use in masking a gap between two parts of a vehicle such as a door and the vehicle body or two doors. Thus, the foam article can be adapted to a range of gap sizes by selecting the combination of the individual foam strips to vary the thickness of the foam article.

Thus, in another aspect, the present invention provides a foam article for use as a masking material comprising a plurality of foam strips, each foam strip having a body portion and side edges, and a cold weld seam releasably securing the foam strips together along at least one side edge whereby, in use of the foam article as a masking material, the arrangement of the foam strips can be adapted to vary the thickness of the foam article.

In yet another aspect, the present invention provides a method of masking a gap between two parts of a vehicle when painting at least one of the parts, the method comprising the steps of providing an elongate foam article comprising a plurality of elongate foam strips joined together by a seam along at least one side edge, and positioning the foam article to mask the gap.

The method may include the step of selecting a combination of foam strips to adapt the thickness of foam article to the gap to be masked.

The method may also include the step of wedging the selected combination of foam strips in the gap without the use of adhesive.

Wedging the selected combination of foam strips in position may be of particular benefit if access to the gap is limited or restricted, for example when masking an "A" post. Thus, the selected combination of foam strips may be positioned in the gap and pulled through to wedge in the gap without the use of adhesive to secure the foam strip inside the gap.

In yet a further aspect, the present invention provides a foam article for use as a masking material comprising a plurality of superimposed foam strips releasably secured together.

The foam strips may be secured together by cold welding or adhesive or any other suitable method that allows selective removal of one or more foam strips. In this way, different thicknesses of masking material can be obtained and/or, after use, contaminated foam strips can be removed to expose fresh strips allowing the masking material to be re-used.

Other features, benefits and advantages of the invention in each of its aspects will be more readily understood from the description hereinafter of exemplary embodiments in which like reference numerals are used throughout to indicate corresponding parts.

The invention will now be described in more detail by way of example only with reference to the accompanying drawings in which like reference numerals are used to indicate corresponding parts.

DETAILED DESCRIPTION

Figure 1:
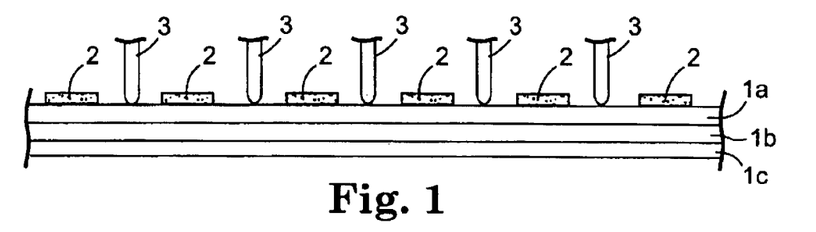
FIG. 1 shows a method of manufacturing foam articles embodying the present invention.

Referring first to FIG. 1, a foam article for use as a masking material embodying the present invention is made by cold welding a plurality of superimposed layers of foam web or sheet. In this example, three layers 1a, 1b, 1c of foam web are employed but it will be understood that the number of layers of foam webs employed may be varied depending on the requirements and intended application of the masking material.

The layers 1a, 1b, 1c of foam web are shown in an uncompressed or free state in FIG. 1. Each layer 1a, 1b, 1c is made of foam which is resiliently compressible and can be cold welded as described later herein. The foam may be open or closed cell polymeric foam and suitable types of foam include polystyrene, polyvinylchloride, polyethylene, polyurethane, polyisocyanate, polyphenol, polyester and silicone foams. Foams having a density of 20 to 30 Kg/m$^3$ are generally useful for use as masking materials. Suitable foam materials are available under the trade designations "4273A" and "X4200AM" from Caligen Foam Limited of Broadoak, Accrington, Lancashire, England.

The selection of the type of foam depends on the requirements and intended application of the masking material and the above examples of suitable materials are not intended to be limiting on the scope of this invention. Other types of foams may be employed where appropriate as will be appreciated by those skilled in the art.

In this embodiment, each layer 1a, 1b, 1c is the same and has a thickness of 7 mm. It will be understood, however that this is not essential and one or more of the layers 1a, 1b, 1c may be of different thickness and/or made of a different type of foam. Thus, any combination of thicknesses and/or foam materials may be employed depending on the requirements and intended application of the masking material. Alternatively or additionally, the layers 1a, 1b, 1c may be distinguished by colour for reasons discussed later.

As shown the upper layer 1a is provided with a plurality of spaced, parallel stripes 2 of an adhesive capable of adhering to the foam material. Suitable adhesives include pressure sensitive adhesives such as hot melt rubber adhesives that can be applied by die coating. Again, the selection and composition of the adhesive depends on the requirements and intended application of the masking material.

In this embodiment, the adhesive stripes 2 are applied to the foam web of the upper layer 1a prior to joining the layers 1a, 1b, 1c together as described below. It will be understood, however, this is not essential and that the adhesive stripes 2 could be provided at any stage in the manufacture of the foam articles.

Furthermore, adhesive stripes 2 could be applied to any of the foam webs forming the layers 1a, 1b, 1c. The arrangement of the stripes 2 depends on the requirements and intended application of the masking material.

The layers 1a, 1b, 1c are cold welded by the application of pressure with rotary rollers or wheels 3 spaced apart a pre-determined distance to form a plurality of spaced, parallel seams 4 extending longitudinally of the webs. The rollers 3 compress the layers 1a, 1b, 1c so that the foam material fuses together to unite the layers 1a, 1b, 1c along the seams.

In this embodiment, the spacing between the seams 4 is about 20 mm but this may be altered to suit the requirements and intended application of the masking material.

Figure 2:
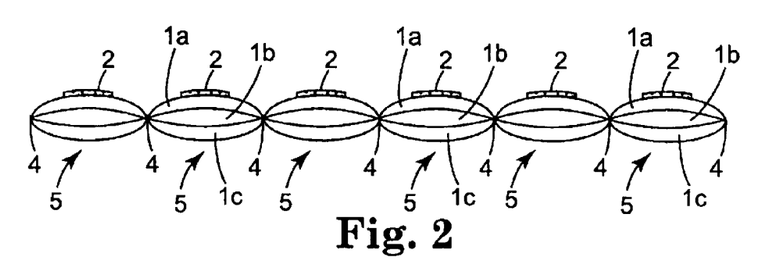
FIG. 2 shows a section through a plurality of foam articles produced by the method of FIG. 1.

FIG. 2 shows the layers 1a, 1b, 1c after the cold welding operation to produce an array of longitudinally extending, parallel foam cords 5 joined by the cold weld seams 4.

The foam cords 5 are separable from each other along the seams 4 either manually or by a suitable cutting device (not shown) and may be stored and supplied in rolls of pre-determined length wound on itself or a core (not shown) from which the user can unwind and separate a required length.

More than one foam cord 5 of the same or different size may be wound on a common core. Where cords 5 of the same size are provided on a common core, these may be provided separately or joined together by the cold weld seams 4 and manually separated by the user when unwinding a required length of the selected cord 5.

Figure 3:
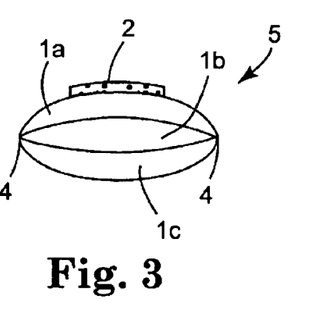
FIG. 3 shows a section through one of the foam articles shown in FIG. 2.

FIG. 3 shows a single foam cord 5 separated from the array of foam cords 5 illustrated in FIG. 2. The foam cord 5 has a generally elliptical shape in which the layers 1a, 1b, 1c of foam web form superimposed foam strips joined along both longitudinally extending side edges by cold weld seams 4.

The shape of the foam cord 5 will depend on a number of factors including the thickness of the layers 1a, 1b, 1c of foam web, the number of layers 1a, 1b, 1c of foam web, the spacing between the cold weld seams 4, and the size and/or position of the adhesive stripe(s) 2. Varying any one or more of these may alter the shape of the foam cord from that illustrated and may be used to produce foam cords having an appropriate shape for any given application.

The foam cord 5 shown in FIG. 3 may be used in this form as a masking material when painting a vehicle to mask a gap between two parts of a vehicle to prevent paint entering the gap as described later herein.

Figure 4:
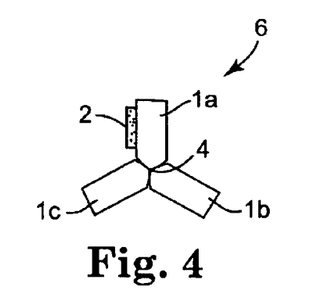
FIG. 4 shows a section through another foam article produced from the foam article shown in FIG. 3.

Alternatively, the foam cord 5 shown in FIG. 3 may be converted to another form shown in FIG. 4 by opening the cold weld seam 4 along one side edge of the foam layers 1a, 1b, 1c. This produces a star shaped foam cord 6 in which the foam layers 1a, 1b, 1c are joined by and radiate from the cold weld seam 4 along the other side edge only.

This alternative form of the foam cord 6 may also be used as a masking material when painting a vehicle to mask a gap between two parts of a vehicle to prevent paint entering the gap as described later herein.

Some modifications illustrating the scope of the invention are shown in FIGS. 5 to 8 which show how the number and/or thickness of the layers of the cords 5, 6 may be altered, and how the arrangement of adhesive stripes and/or colour of the layers of the cords 5, 6 may be varied.

Figure 5A:
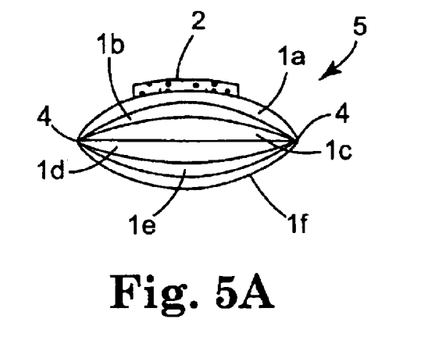
FIGS. 5A, 5B show modifications of the foam articles shown in FIGS. 3 and 4.
Figure 5B:
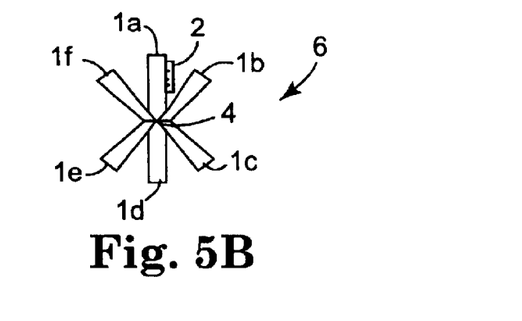
Figure 6A:
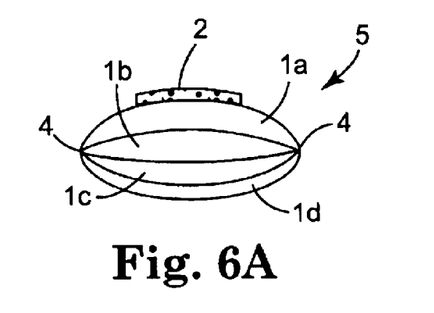
FIGS. 6A, 6B shows another modification of the foam articles shown in FIGS. 3 and 4.
Figure 6B:
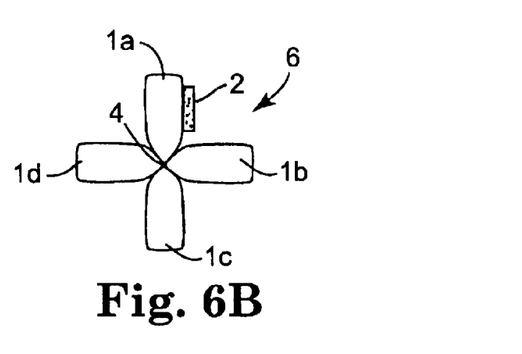
Figure 7A:
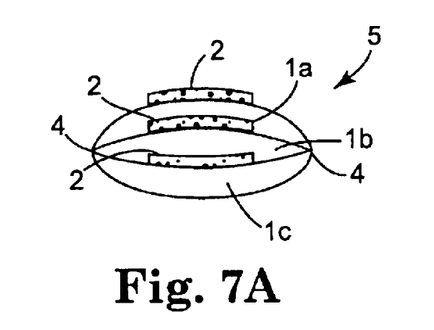
FIGS. 7A, 7B shows a further modification of the foam articles shown in FIGS. 3 and 4.
Figure 7B:
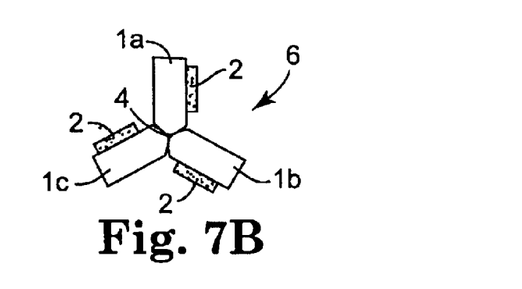
Figure 8A:
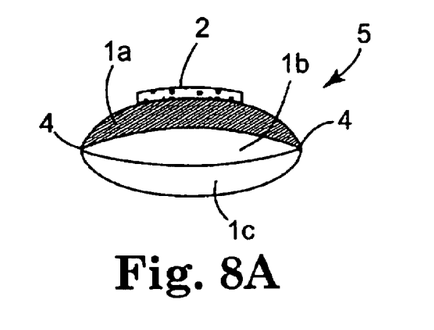
FIGS. 8A, 8B shows a still further modification of the foam articles shown in FIGS. 3 and 4.
Figure 8B:
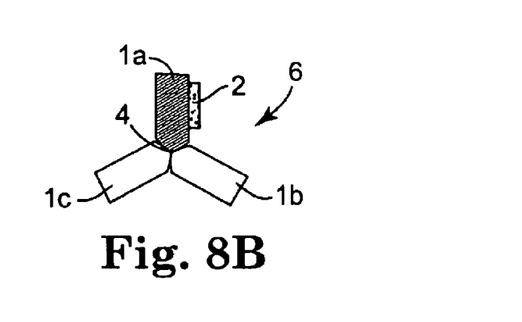

FIGS. 5A, 5B show cords 5, 6 made from six layers 1a, 1b, 1c, 1d, 1e, 1f of foam web of the same thickness, for example 4 mm. FIGS. 6A, 6B show cords 5, 6 made from four layers 1a, 1b, 1c, 1d of foam web of different thicknesses, for example 4 mm, 5 mm, 6 mm, 7 mm. FIGS. 7A, 7B show cords 5, 6 in which an adhesive stripe 2 is provided on each layer 1a, 1b, 1c. FIGS. 8A, 8B show cords 5, 6 in which the layer 1a is of different colour to the layers 1b, 1c to indicate a difference in thickness or foam material between the layer 1a and the layers 1b, 1c.

These examples are illustrative only of different possible constructions of the cords 5, 6 and it will be appreciated that the principles or concepts embodied therein may be generally applied to produce other constructions having the benefits and advantages referred to herein.

Various examples of the application of the foam cord 6 shown in FIG. 4 as masking materials are now described with reference to FIG. 9 to 11.

FIGS. 9A, 9B, 9C, 9D show the use of the star-shaped foam cord 6 of FIG. 4 to mask a gap 7 between the front edge 8a of a vehicle front door 8 and an adjacent edge 9a of a body part 9 such as a front wing to protect the A-post 11 when painting the door 8 and/or body part 9.

Figure 9A:
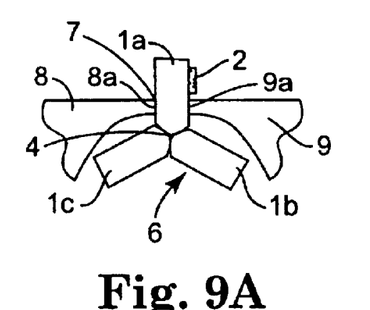
FIGS. 9A to 9D show the application of the foam article shown in FIG. 4 as a masking material to mask an A-post.

The foam cord 6 is held by the foam layer 1a having the adhesive stripe 2. The door 8 is opened and the other foam layers 1b, 1c fed into the gap 7. The door 8 is then gently closed and the foam cord 6 fed along the length of the gap 7 by pulling through with the protruding layer 1a as shown in FIG. 9A.

Figure 9B:
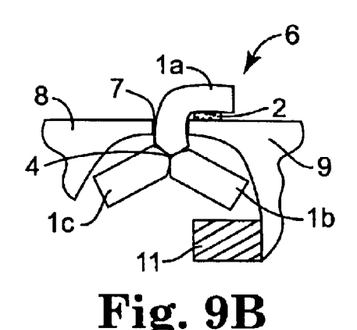

If blending across the gap 7 between the door 8 and part 9 is not required, the foam cord 6 is secured by folding down the layer 1a and sticking to the part 9 using the adhesive stripe 2 as shown in FIG. 9B when painting the door 8. The orientation of the foam cord 6 may be reversed to stick the layer 1a to the door 8 when painting the part 9.

Figure 9C:
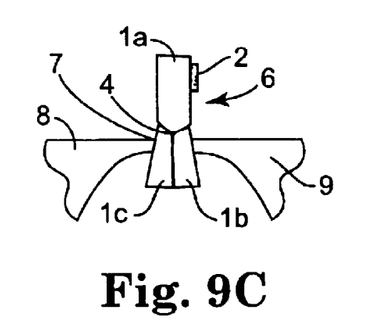
Figure 9D:
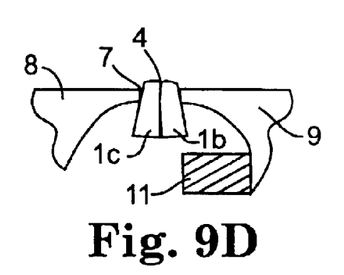

If blending across the gap 7 is required when painting both the door 8 and part 9, the foam cord 6 is pulled up so as to wedge the layers 1b, 1c in the gap 7 as shown in FIG. 9C. The layer 1a is then removed by separating along the cold weld seam 4 as shown in FIG. 9D. The cord 6 remains in place due to the friction wedging the layers 1b, 1c in the gap 7.

Figure 10A:
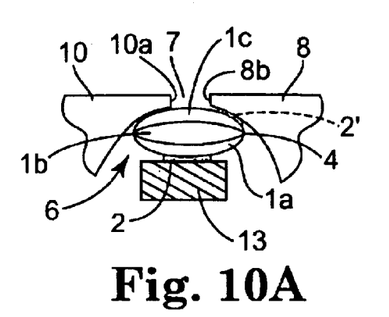
FIGS. 10A, 10B show the application of the foam article shown in FIG. 4 as a masking material to mask a B-post.
Figure 10B:
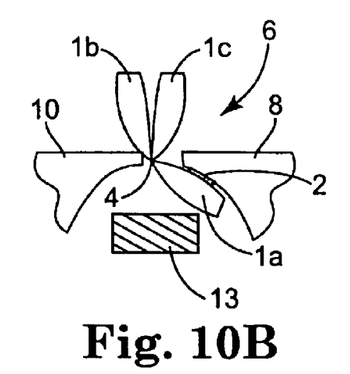

FIGS. 10A, 10B show the use of the star-shaped cord 6 of FIG. 4 to mask a gap 7 between the rear edge 8b of a vehicle front door 8 and the front edge 10a of a vehicle rear door 10 to protect the B-post 13 when painting the door 8 and/or door 10.

The front door 8 is opened and the cord 6 secured by sticking the layer 1a to either the B-post 13 (FIG. 10A) or the inside of the door 8 (FIG. 10B) with the adhesive stripe 2.

If the layer 1a is attached to the B-post 13 as shown in FIG. 10A, the layers 1b, 1c are folded down to overlie the layer 1a and held in place when the door 8 is closed. The cord 6 masks the gap 7 and allows blending across the gap 7.

If desired, the layer 1c adjacent to the door 8 may have an adhesive stripe 2' as indicated in dotted lines to adhere to the inside of the closed door 8. The adhesive stripe 2' may be applied to the layer 1c prior to cold welding to join the layers 1a, 1b, 1c.

If the layer 1a is attached to the inside of the door 8 as shown in FIG. 10B, one or both of the layers 1b, 1c protrudes through the gap 7 when the door 8 is closed. Any protruding layer 1b, 1c can be left if blending across the gap 7 is not required or pushed back into the gap 7 if blending across the gap 7 is required.

Figure 11A:
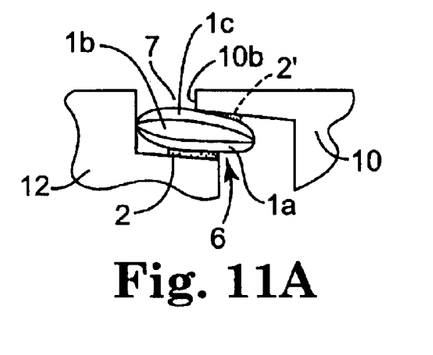
FIGS. 11A, 11B show the application of the foam article shown in FIG. 4 as a masking material to mask a C-post.
Figure 11B:
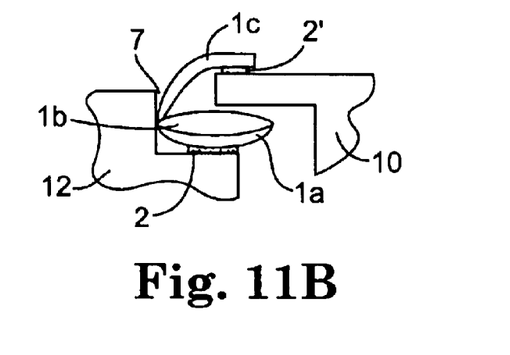
Figure 12:
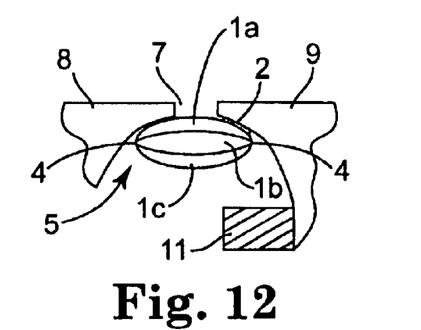
FIG. 12 shows the application of the foam article shown in FIG. 3 as a masking material to mask an A-post.
Figure 13:
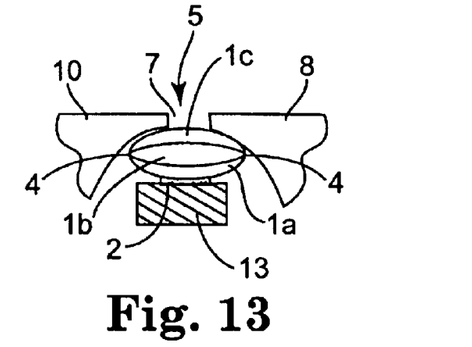
FIG. 13 shows the application of the foam article shown in FIG. 3 as a masking material to mask a B-post.
Figure 14:
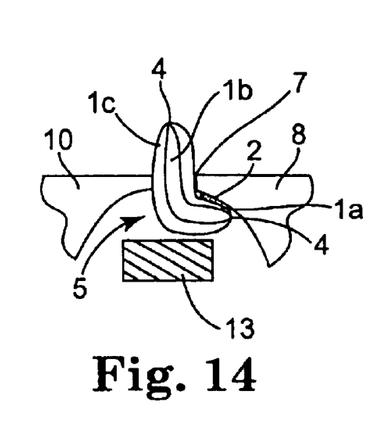
FIG. 14 shows an alternative application of the foam article shown in FIG. 3 as a masking material to mask a B-post.

FIGS. 11A, 11B show the use of the star-shaped cord 6 of FIG. 4 to mask a gap 7 between the rear edge 10b of a rear door 10 and a body part 12 such as a rear wing to protect a C-post when painting the door 10 and/or part 12.

The rear door 10 is opened and the cord 6 secured by sticking the layer 1a to the body part 12 with the adhesive stripe 2.

The layers 1b, 1c are folded down to overlie the layer 1a and held in place when the door 10 is shut. The cord 6 masks the gap 7 while allowing blending across the gap 7 as shown in FIG. 11A.

If desired, the layer 1c adjacent to the door 10 may be provided with an adhesive stripe 2' as shown in dotted line to adhere to the door 10. The stripe 2' maybe applied to the layer 1c prior to cold welding the layers 1a, 1b, 1c.

If blending across the gap 7 is not required, one of the layers 1b, 1c can be left to protrude through the gap 7 and used to mask up to the edge of gap 7 on one side either by securing the protruding layer with masking tape or by providing this layer with an adhesive stripe 2' for sticking to the appropriate surface as shown in FIG. 11B.

The above examples illustrate alternative ways of locating and securing the cord 6. Thus, the cord 6 can be adhesively secured to a surface inside the gap to be masked when a suitable surface is readily accessible by opening a door or similar movable panel such as when protecting the B-post 13 or C-post of a vehicle.

Alternatively, when access to a surface inside the gap 7 is restricted, the cord 6 can be wedged in the gap without the use of adhesive or adhesively secured to a surface outside the gap such as when protecting the A-post 11 of a vehicle.

Of course, it will be appreciated that wedging the cord 6 in the gap 7 or adhesively securing the cord to a surface outside the gap 7 could also be employed in locations where surfaces inside the gap 7 are accessible, for example when protecting the B-post 13 or C-post of a vehicle.

Figure 15:
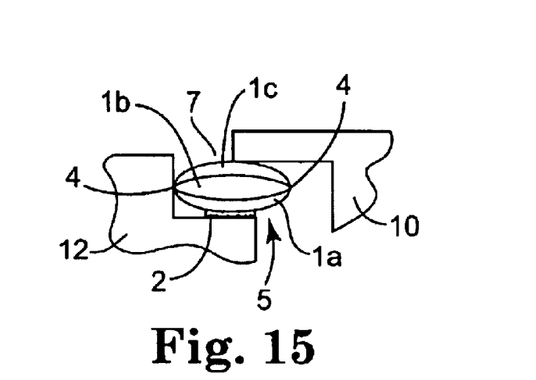
FIG. 15 shows the application of the foam article shown in FIG. 3 as a masking material to mask a C-post.

Referring now to FIGS. 12 to 15, these show how the cord 5 of FIG. 3 can be used in place of the cord 6 to mask a gap 7 between two parts (8, 9) or (8, 10) or (10, 12) of a vehicle to protect an A-post 11 (FIG. 12), B-post 13 (FIGS. 13 and 14), and a C-post (FIG. 15).

In each of these examples, the cord 5 is shown attached to a surface inside the gap 7 using the adhesive stripe 2 as shown and arranged to mask the gap 7 to allow blending across the gap 7 if required or to protrude from the gap 7 if blending is not required.

It will be appreciated however, that the cord 5 could be located and secured in position by wedging in the gap 7 and optionally securing to a surface outside the gap 7 using the adhesive stripe 2 as described previously for the cord 6.

Figure 16A:
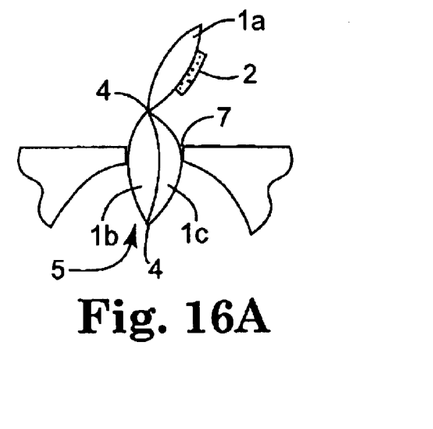
FIGS. 16A, 16B shows an alternative application of the foam article shown in FIG. 3 as a masking material.
Figure 16B:
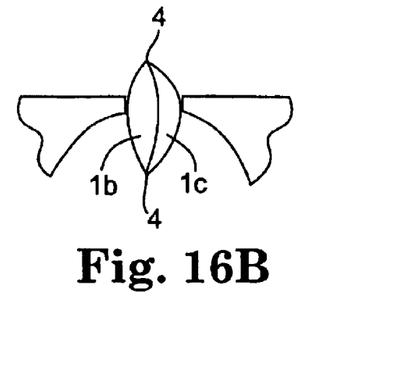

For this, the layer 1a may be released along one side of the cord 5 and used to hold the cord 5 when inserting and feeding the cord 5 along the gap 7, pulling the cord 5 into the gap to wedge it in place as shown in FIG. 16A and then removing the layer 1a if desired as shown in FIG. 16B.

The foregoing examples illustrates the versatility of both forms of the foam cord 5, 6 produced by cold welding multiple layers 1a, 1b, 1c of foam web to produce a masking material for masking across a gap between two parts of a vehicle.

In particular, the multiple layers 1a, 1b, 1c of foam web enable the cords 5, 6 to be adapted to provide different thicknesses of masking material for masking across gaps in a range of sizes and locations. The same cord 5, 6 may therefore be used where previously several different cords were required to mask across gaps of different sizes and/or in different locations.

Figure 17A:
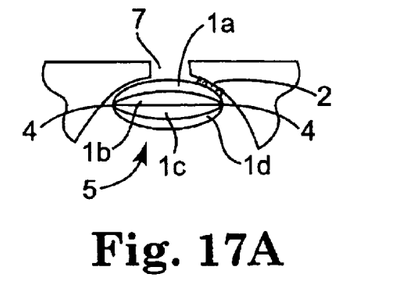
FIGS. 17A, 17B show the application of the foam article shown in FIG. 5A as a masking material to mask gaps of different size.
Figure 17B:
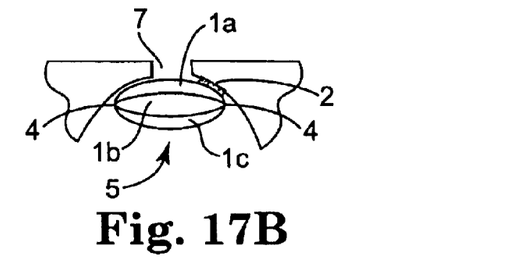

For example, the cord 5 shown in FIG. 5A can be adapted to provide a required thickness of masking material for different sizes of gap 7 by removing one or more foam strips as shown in FIGS. 17A, 17B.

Figure 18A:
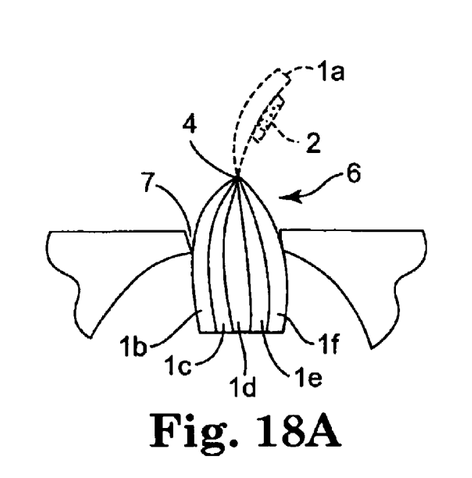
FIGS. 18A, 18B show the application of the foam article shown in FIG. 5B as a masking material to mask gaps of different size.
Figure 18B:
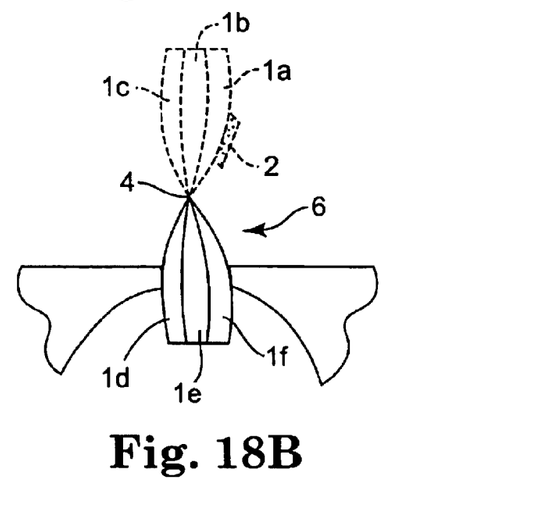

Similarly, the cord 6 shown in FIG. 5B can be adapted to provide a required thickness of masking material for different sizes of gap 7 by superimposing the appropriate number of foam strips as shown in FIGS. 18A, 18B.

It will be appreciated, however, that many different combinations of the number of foam layers and/or the thickness of individual foam layers may be employed in which all the layers may be of the same thickness or one or more foam layers may be of different thickness to the other layers. All combinations of the number and/or thickness of the individual foam layers forming the cords are within the scope of the present invention.

A further advantage of forming the cords from multiple layers 1a, 1b, 1c of foam web is that the cords 5, 6 may be used more than once. For example, after painting, any foam layer of cord 5 that has been painted may be removed to reveal an underlying clean foam layer. Likewise, after painting, any foam layer of cord 6 that has been painted may be removed or, alternatively, the foam layers may be folded in a different configuration to conceal the painted foam layer.

The extent to which the cords 5, 6 can be re-used may depend on the number and/or thickness of the foam layers forming the initial cord 5, 6 and thus, the range of sizes that can be obtained by different combinations of the foam layers. A large number of relatively thin foam layers may provide more options than a small number of relatively thick foam layers.

Where foam layers of different thickness are employed, these may be provided in different colours to assist identification and selection of the appropriate combination of foam layers to produce a desired overall thickness of cord 5, 6.

Adhesive stripes may also be provided on more than one foam layer of the cords 5, 6. Thus, each foam layer in the finished cord 5, 6 may have an adhesive stripe. This may allow the cord 5, 6 to be stuck to more than one surface in use.

Alternatively or additionally, after use, the foam layer used to stick the cord to a surface may be removed to reveal a foam layer with a fresh adhesive stripe for sticking the cord when re-using the masking material.

Figure 19:
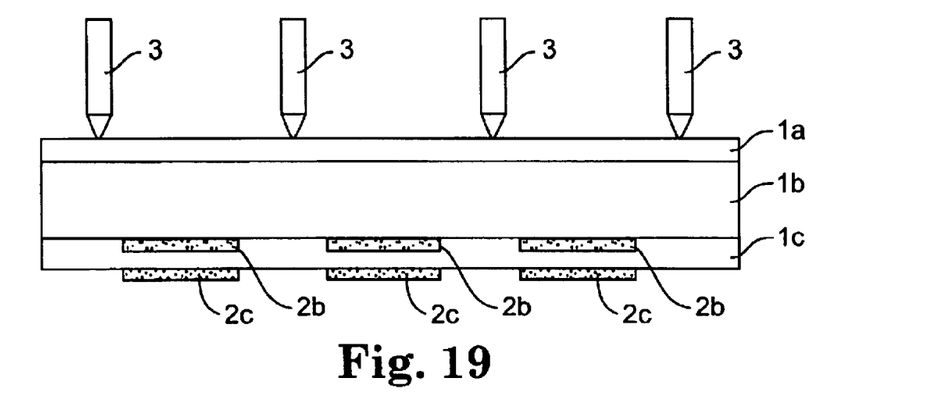
FIG. 19 is a view similar to FIG. 1 showing the method of manufacturing foam articles according to another embodiment of the invention.
Figure 20:
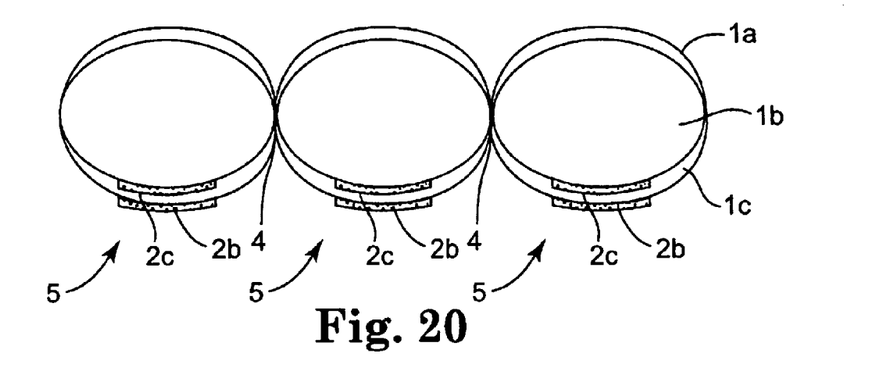
FIG. 20 is a view similar to FIG. 2 showing a section through a plurality of foam articles produced by the method of FIG. 19.
Figure 21:
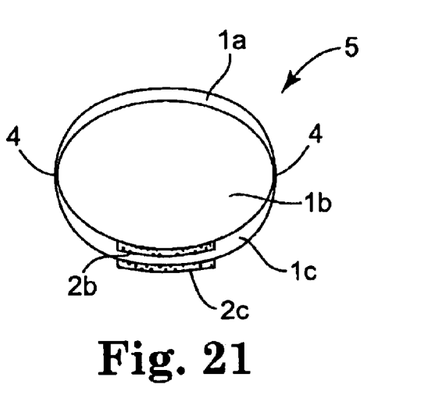
FIG. 21 is a view similar to FIG. 3 showing a section through one of the foam articles shown in FIG. 20.

Referring now to FIGS. 19 to 21, these show a cord 5 and method of producing the cord 5 similar to FIGS. 1 to 3 but in which the removable outer layers 1a, 1c are of different thickness to the centre or core layer 1b.

In this embodiment, three superimposed layers 1a, 1b, 1c of foam web are cold welded to produce an array of longitudinally extending, parallel cords 5 joined together by cold weld seams 4 as before. The outer layers 1a, 1c are of the same thickness and the centre layer 1b is of substantially greater thickness than the combined thickness of the layers 1a, 1c. Also, an adhesive stripe 2b is provided on the surface of layer 1b facing outer layer 1c in addition to the adhesive stripe 2c on the outer surface of layer 1c.

In use, the foam cord 5 may be secured with the adhesive stripe 2c of the outer layer 1c to mask across a gap as described previously. After use, the outer layers 1a, 1c can be removed to expose the clean surfaces on both sides of the centre layer 1b. The cord 5 can then be re-used to mask across a gap by securing in position with the adhesive stripe 2b of the centre layer 1b. Before re-use, the cord 5 can be stored without removing the outer layers 1a, 1c so that the clean surfaces of the centre layer 1b are protected beneath the outer layers 1a, 1c until it is desired to re-use the cord 5.

The cord 5 may have portions of different colour, for example the layer 1a may be a light coloured foam and the layer 1c a dark coloured foam, such that a colour contrast is produced at each side edge of the cord 5 creating a longitudinal sight line which may be used to facilitate accurate positioning of the cord 5. A colour contrast between portions of the cord 5 may also be employed to provide a longitudinal sight line between the side edges of the cord 5 on one or both faces of the cord 5 to assist accurate positioning of the cord 5. The colour contrast may be produced by any suitable method and may be repeated for any underlying layers on re-use of the cord 5 if the outer layers are removed.

It will be appreciated that foam cords 5 may be produced having a centre layer with one or more removable outer layers on each side and in any combination of thicknesses. By providing a centre layer of substantially greater thickness than the removable outer layers, there is only a small reduction in the thickness of the cord 5 on each re-use. Alternatively, the thickness of the removable outer layers may be chosen to produce a desired reduction in thickness of the cord 5 when the outer layers are removed. For example, we may produce a cord 5 having a centre layer 13 mm thick and an outer layer 3 mm thick on each side such that the cord 5 has an initial thickness of 19 mm which is reduced to 13 mm for re-use when the outer layers are removed.

In general, it can be seen that for a cord consisting of n layers, there are n−1 uses if the outer layers on both sides are removed after each use. In some cases, however, if cross-contamination from any painted layer is not a problem it may only be necessary to remove one of the layers to expose a new adhesive stripe to secure the cord in position. In this case, if there are n layers with adhesive in the original cord, there are n uses if an adhesive bearing layer is removed before each re-use. For some applications, it may even be possible to re-use the cord without removing any of the layers. Accordingly, it can be seen that the multi-layer construction of the cord provides many options for the application and use of the cord.

Where an adhesive stripe for securing the cord is provided between two superimposed layers of the cord, a release coat (not shown) may be applied to the inner surface of the outer layer to reduce or prevent adhesion of this layer to the adhesive stripe of the underlying inner layer. In this way, removal of the outer layer is facilitated. Such release coats are well known to those skilled in the art and are typically referred to as LAB's (Low Adhesion Backsize).

Alternatively, a non-stick liner or laminate (not shown) may be incorporated between the outer layer and the underlying inner layer to facilitate removal of the outer layer. Such liner or laminate may be incorporated during the cold welding process for producing the multi-layer masking material.

Alternatively, the outer layer may be sculpted or otherwise shaped on the inner surface to minimise contact with the opposed adhesive stripe of the underlying inner layer to facilitate removal of the outer layer.

Figure 22:
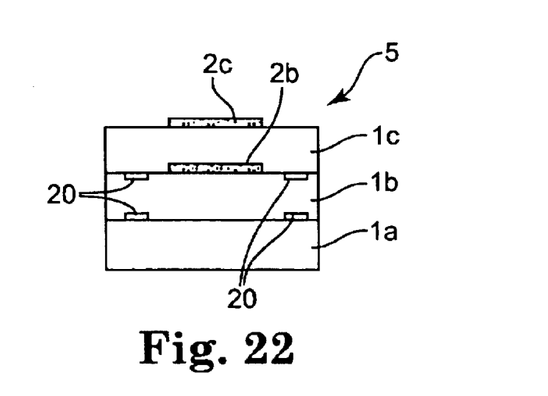
FIG. 22 shows a section through another foam article embodying the invention.

Other modifications and variations will be apparent to those skilled in the art. For example, although we have described constructions of foam cord in which superimposed layers of foam are secured by cold weld seams along both sides edges of the cord, it will be appreciated that similar constructions could be made using adhesive strips instead of cold welds to hold the layers together. FIG. 22 shows an example of a cord formed from three superimposed layers 1a, 1b, 1c of foam secured together by adhesive strips 20 along both side edges of the cord. These strips 20 may have a low tack so as to hold the layers 1a, 1b, 1c together but allow the layers 1a, 1c to be removed without damaging the underlying layer 1b. In this embodiment, layers 1b and 1c include adhesive 2b and 2c, respectively. This construction may permit cords to be produced having any desired cross-section.

It will be understood that the above-described examples are intended to illustrate the diverse range and application of the invented foam articles and that features of the embodiments may be used separately or in combination with any other feature of the same or different embodiments to produce a foam article that can be used as a masking material.

Moreover, while the specific materials and/or configuration of the foam articles described and illustrated are believed to represent the best means currently known to the applicant for producing foam articles having application as multi-purpose masking materials, it will be appreciated that the invention is not limited thereto and that various modifications and improvements can be made within the spirit and scope of the claims.

What is claimed is:

1. A foam article for use as a masking material comprising three or more elongate foam strips, each strip having a longitudinally extending edge and being joined at said longitudinally extending edge to a longitudinally extending edge of at least two further elongate strips by a seam common to all said strips, wherein said common seam joins all the foam strips along one side edge and the other side edge is free, and wherein the foam strips are separable along said common seam.

2. A foam article according to claim 1 wherein each foam strip is of generally elongate cross-section having longitudinally extending edges on opposite sides of a longitudinally extending body portion.

3. A foam article according to claim 1 wherein the foam strips are all of the same thickness.

4. A foam article according to claim 1 wherein at least one foam strip is of different thickness to at least one other foam strip.

5. A foam article according to claim 1 wherein the foam strips have a combined thickness of up to 30 mm.

6. A foam article according to claim 1 wherein the foam strips are made of the same foam material.

7. A foam article according to claim 1 wherein at least one foam strip is made of a different foam material to at least one other foam strip.

8. A foam article according to claim 1 wherein the foam strips are made of an open cell foam material.

9. A foam article according to claim 1 wherein the foam strips are made of a closed cell foam material.

10. A foam article according to claim 1 wherein the foam strips are made of foam material selected from the group comprising polystyrene, polyvinylchloride, polyethylene, polyurethane, polyvisocyanate, polyphenol, polyester and silicone foams.

11. A foam article according to claim 1 wherein the foam strips are made of foam having a density of 20 to 30 Kg/m$^3$.

12. A foam article according to claim 1 wherein the foam strips are all of the same colour.

13. A foam article according to claim 1 wherein at least one foam strip is of different colour to at least one other foam strip.

14. A foam article according to claim 1 wherein the foam strips are made of cold weldable material.

15. A foam article according to claim 1 wherein at least one foam strip has a longitudinally extending adhesive stripe.

16. A foam article for use as a masking material comprising at least three foam strips releasably secured together, wherein the at least three foam strips have a first longitudinally extending edge and a second longitudinally extending edge and the at least three foam strips are joined at the first longitudinally extending edge and the second longitudinally extending edge and include areas between the first longitudinally extending edge and the second longitudinally extending edge where the foam strips are not joined.

17. A foam article as claimed in claim 16 wherein the foam strips are secured together at the first longitudinally extending edge and the second longitudinally extending edge by cold welding.

18. A foam article as claimed in claim 16 wherein the foam strips are secured together at the first longitudinally extending edge and the second longitudinally extending edge by adhesive.

19. A foam article as claimed in claim 16 wherein the foam strips are of substantially the same thickness.

20. A foam article as claimed in claim 16 wherein one or more of the foam strips is of different thickness to the other foam strips.

21. A foam article as claimed in claim 16 comprising a centre foam strip and one or more removable foam strips on each side.

22. A foam article according to claim 16, wherein the foam strips comprise an adhesive stripe between two foam strips and a release coat to reduce adhesion between the two foam strips.

23. A foam article according to claim 16, wherein the at least three foam strips comprise an outer layer having a sculpted inner surface and an inner layer having an adhesive stripe.

24. A foam article for use as a masking material comprising three or more elongate foam strips, each strip having a longitudinally extending edge and being joined at said longitudinally extending edge to a longitudinally extending edge of at least two further elongate strips by a seam common to all said strips, wherein said common seam joins all the foam strips along one side edge and a further common seam joins all the foam strips along the other side edge, and wherein the foam strips are separable along said common seams.

* * * * *

UNITED STATES PATENT AND TRADEMARK OFFICE
CERTIFICATE OF CORRECTION

PATENT NO. : 6,797,361 B2
DATED : September 28, 2004
INVENTOR(S) : Bouic, Phillip J.

It is certified that error appears in the above-identified patent and that said Letters Patent is hereby corrected as shown below:

<u>Title page,</u>
Item [54], Title, should read -- IMPROVEMENTS IN OR RELATING TO FOAM ARTICLES --.
Item [56], References Cited, U.S. PATENT DOCUMENTS, immediately prior to "4,996,092" please insert
-- 4,484,574    11/1984        DeRusha et al.  602/75
   4,698,252    10/1987        Koch et al.     428/159 --.

<u>Column 12,</u>
Line 41, "LAB's" should read -- LABs --.
Line 49, "minimise" should read -- minimize --.

<u>Column 13,</u>
Line 24, after "free" delete ",".
Line 31, "polyvisocyanate" should read -- polyisocyanate --.
Line 54, after "all" insert -- , --.

Signed and Sealed this

Nineteenth Day of April, 2005

JON W. DUDAS
*Director of the United States Patent and Trademark Office*